March 7, 1967 R. W. WULLENWABER 3,307,253
METHOD OF ASSEMBLING COAXIALLY ALIGNED FIRST
AND SECOND TUBULAR MEMBERS
Filed April 23, 1962 3 Sheets-Sheet 1
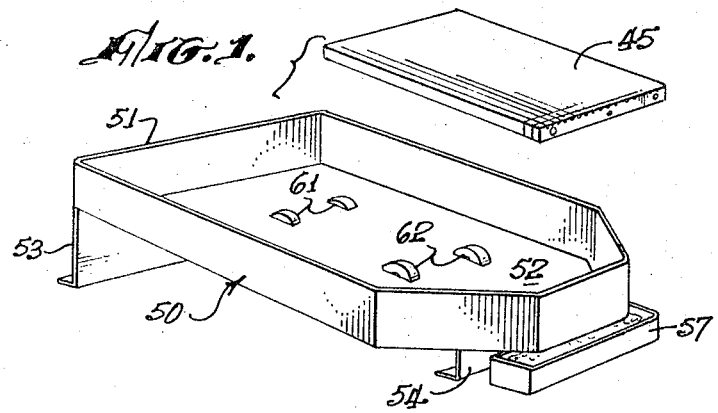
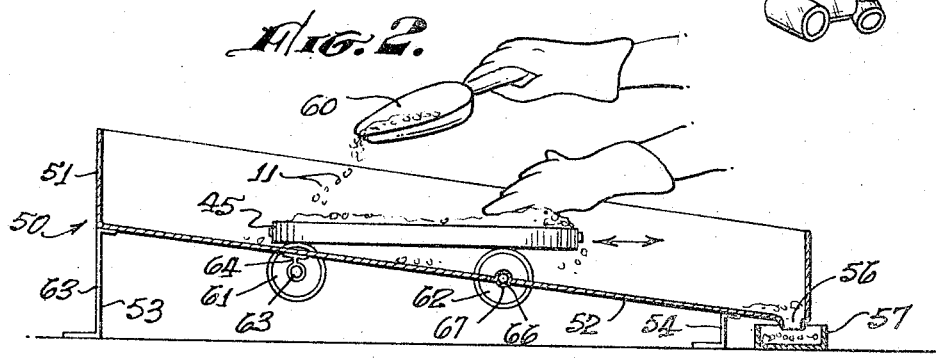
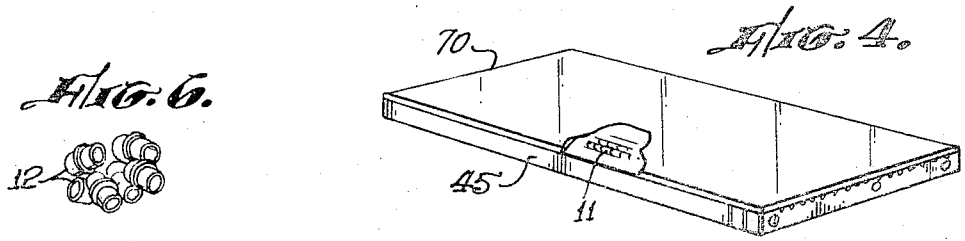
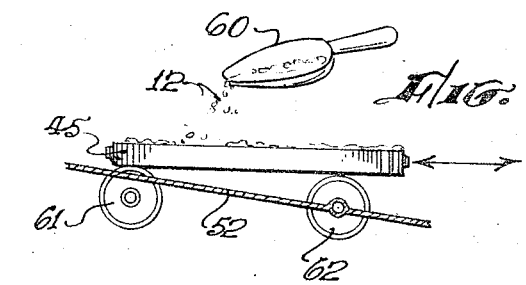
ROBERT W. WULLENWABER,
INVENTOR.
BY HIS ATTORNEYS
Spensley & Horn

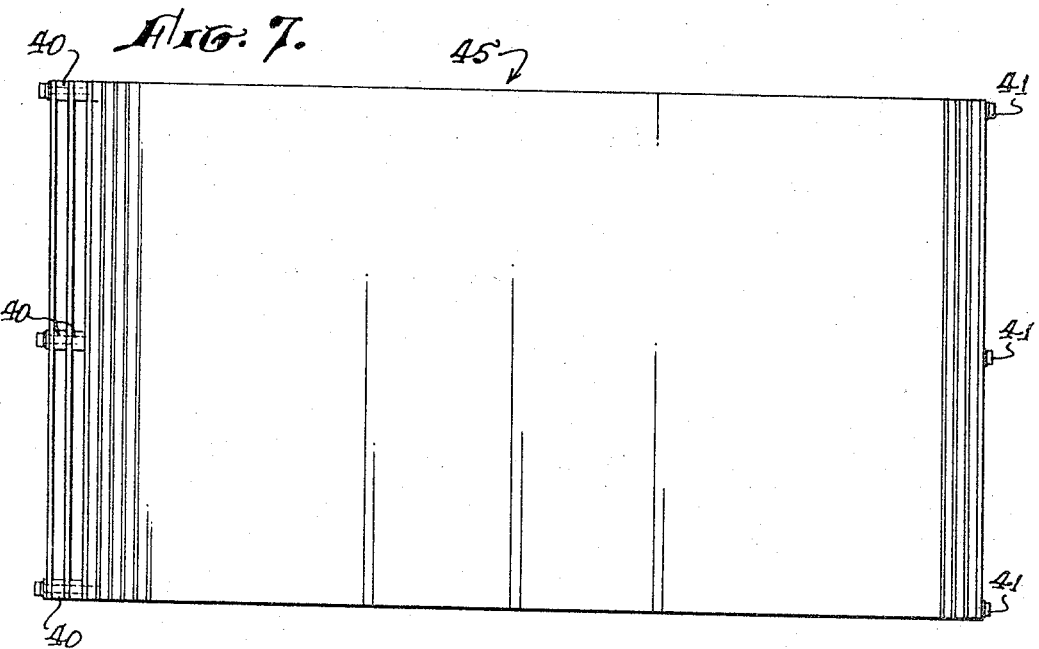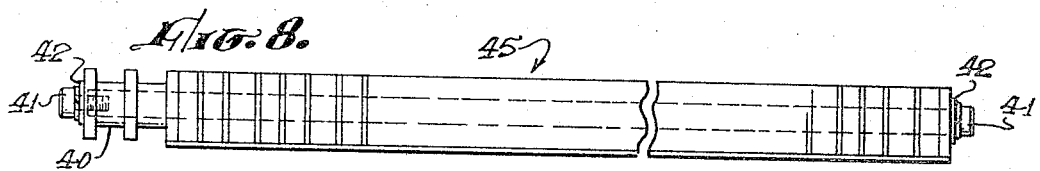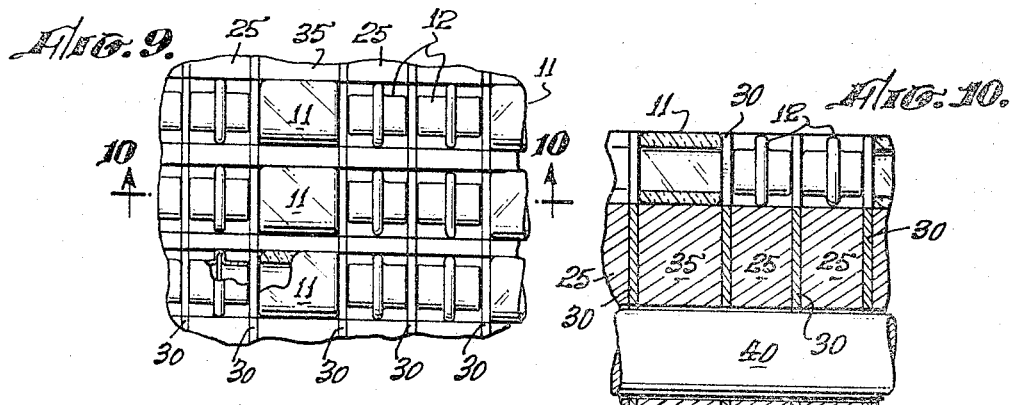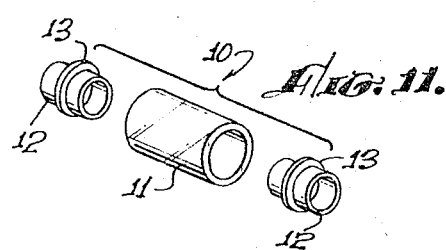

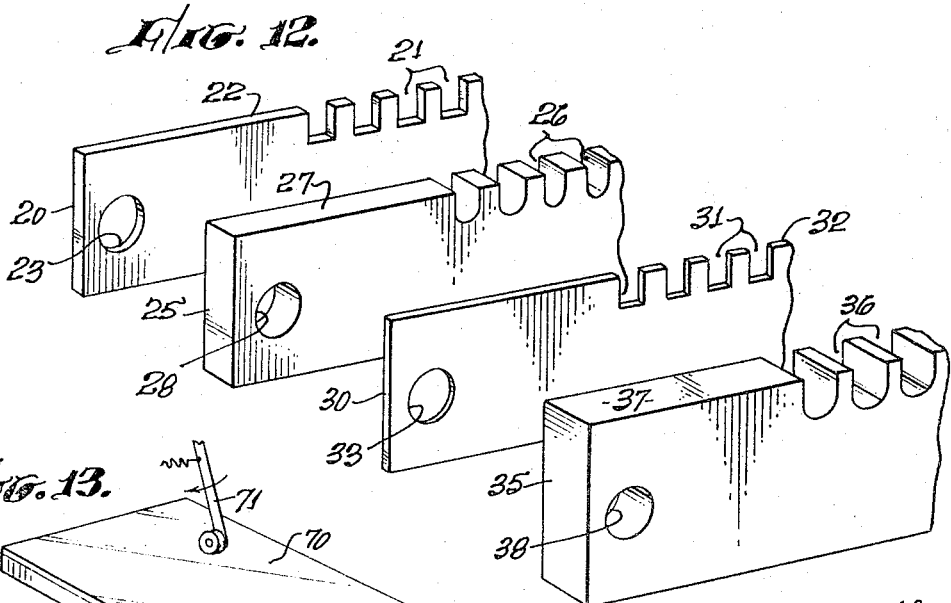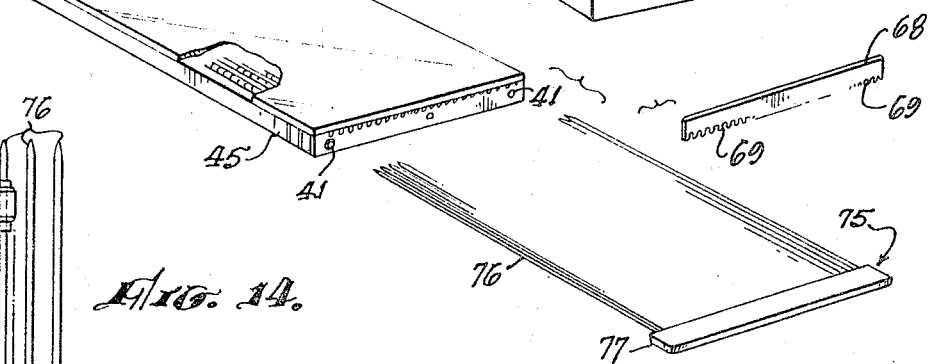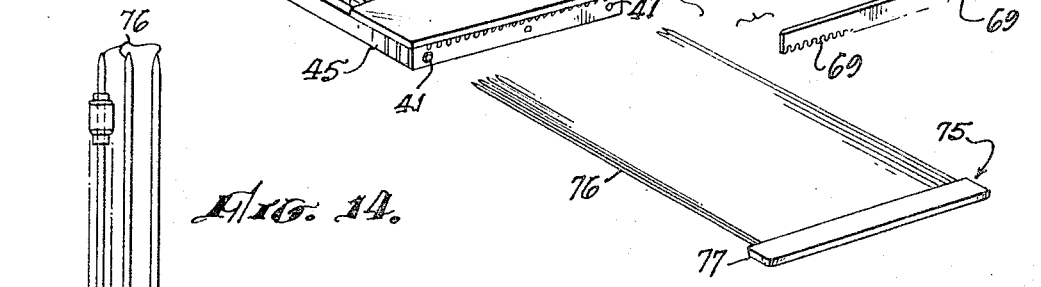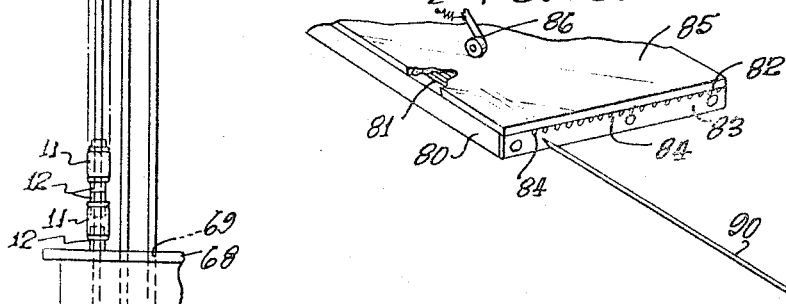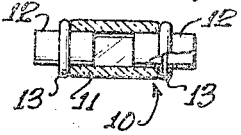

United States Patent Office 3,307,253
Patented Mar. 7, 1967

3,307,253
METHOD OF ASSEMBLING COAXIALLY ALIGNED FIRST AND SECOND TUBULAR MEMBERS
Robert W. Wullenwaber, Rolling Hills Estates, Calif., assignor to TRW Semiconductors, Inc., a corporation of Delaware
Filed Apr. 23, 1962, Ser. No. 189,353
6 Claims. (Cl. 29—433)

This invention relates to an improved method of manufacturing subassemblies and more particularly to the manufacture of glass-to-metal subassemblies especially suited for hermetically encapsulating electronic components such as semiconductor diodes. This present invention is directed to a technique for preassembling such glass-to-metal subassemblies during their fabrication.

In the manufacture of certain electrical devices, it is especially important to house the electrical element forming the heart of the device in a hermetically sealed envelope. For example, semiconductor devices are commonly encapsulated in a hermetically sealed envelope to insure consistent operation and long life. Various types of encapsulating structures have been evolved to protect the semiconductive material from chemical contamination and to provide other desirable features, such as good thermal dissipation, shock and vibration resistance, and ease of connection. It has long been recognized in the semiconductor art that the hermetically sealed package, wherein the semiconductor crystal is mounted within a miniaturized cylindrical housing having a central region composed of a glass tube, affords a foundation for designing an ideal hermetically sealed package. One such package is described and claimed in U.S. Patent No. 2,815,474, entitled, "Glass Sealed Semiconductor Rectifier," issued on December 3, 1957, to William M. Lewis, Jr., and Henry D. Frazier. This particular package includes a central glass cylinder to which is sealed a pair of tubular metal shells at opposite ends thereof. The resulting assembly is called a fused body subassembly. Such fused body subassemblies are commonly formed by fusing the metal shells to opposite ends of the glass cylinder by means of a fusion machine utilizing radio frequency energy to supply the necessary heat. Prior to the present invention the glass cylinders and metal shells were prepared for fusion by stringing a plurality of the cylinders and shells in the proper order of shell-cylinder-shell, shell-cylinder-shell, etc., upon a stiff wire mandrel by hand. The cylinders and shells are fixed in place on the wire mandrels wtihout an axial load. A plurality of such strung wire mandrels are then placed in a suitable boat such as thin gauge nickel and heated for a predetermined time and at a predetermined temperature to cause the glass to soften sufficiently to shrink onto the adjacent shells and form an incomplete glass-to-metal seal, commonly termed a "black seal." After heating, the resulting preassembled encapsulating structures are rapidly cooled to a temperature below the softening point of the glass and removed from the mandrels. The individual preassembled structures are then inserted into the fusion machine where complete fusion occurs to provide a true hermetic seal, commonly called a "gray seal," and form the desired fused body subassembly. A complete description of the black seal process is found in co-pending U.S. Patent application Serial No. 786,316, filed January 12, 1959, now abandoned, by Clinton E. Maiden, the application being entitled, "Glass-to-Metal Seal," and being assigned to the assignee of the present invention. A complete description of a suitable fusion machine for use in the gray seal process is found in co-pending U.S. Patent Application Serial No. 86,150, filed January 12, 1959, now Patent No. 3,010,573, by Henry D. Frazier and Pat W. Richey, the application being entitled, "Single Station Fusion Machine," and also assigned to the present assignee.

Before the advent of the black seal process, and the preassembly of the encapsulating structures, the glass cylinder and the metal shells were individually assembled in the fusion machine. Introduction of the black seal process resulted in a significant increase in the yield of properly fused subassemblies due to elimination of the inconsistency of the fusion encountered upon the manual assembly of the structural parts individually in the fusion machine. It was found that the principal causes of inconsistent fusion were the variation in fit between the inner diameter of the glass cylinder and the outer diameter of the mating metal shells, and inconsistent cooling of the fusion machine mandrels during the varying periods of loading the machine with the next structure to be fused. Through utilization of the black seal process, in which the glass cylinder is pre-shrunk onto the metal shells, the pre-assembled structures presented to the fusion machine are all of substantially identical good fit. Furthermore, because of the elimination of the necessity for physically assembling and holding the cylinders and shells in coaxial alignment in the fusion machine the machine may be rapidly loaded, thereby permitting a subsequent fusion cycle before the mandrels of the fusion machine can cool an excessive amount.

Even though the black seal process has resulted in a significant decrease in the costs of fabricating the fused subassemblies by increasing the yield and reducing the labor and time required, the present black seal process is still relatively inefficient since the glass cylinders and metal shells are individually strung by hand onto the wire mandrels prior to creation of the black seal. It is apparent that a significant increase in the rate at which the shells and cylinders can be strung on the wire mandrels would result in a more efficient and less costly and time consuming process.

Accordingly, it is an object of the present invention to provide an improved technique for the fabrication of encapsulating structures.

It is also an object of the present invention to provide an improved mass production technique for the fabrication of encapsulating structures.

It is another object of the present invention to provide an improved method of preassembling encapsulating structures.

It is further object of the present invention to provide an improved method of fabricating glass-to-metal subassemblies.

It is yet another object of the present invention to provide a rapid and efficient method for preassembling tubular glass-to-metal components.

It is a still further object of the present invention to provide a relatively inexpensive method for fabricating glass-to-metal subassemblies, the method being suitable for use with mass production techniques.

It is still another object of the present invention to provide an improved mass production technique for preassembling glass-metal encapsulating structures.

The objects of the present invention are accomplished by a method of simultaneously preassembling a plurality of glass cylinders and metal shells and subjecting them to a presealing process so that when the preassembled structures are subsequently presented to a fusion machine, they will be of substantially identical size and fit. The apparatus consists mainly of a novel jig having an upper surface defining apertures for maintaining a predetermined number of glass cylinders in axial alignment between a pair of metal shells, this being the desired alignment for fabrication of the cylinders and shells into the preassembled encapsulating structures. The apertures for reception of the glass cylinders are larger than the contiguous apertures for reception of the metal shells, the pattern of apertures in the jig surface accommodating rows of axially aligned components placed end to end, in the desired alignment. The method includes randomly scattering a large number of glass cylinders upon the jig surface and agitating the jig to cause a predetermined number of the glass cylinders to drop into the larger apertures in the jig, the excess of the glass cylinders then being removed from the surface of the jig. Next, a large number of metal shells are randomly scattered over the surface of the jig and the jig agitated to cause a predetermined number of the shells to fall into the smaller apertures, the larger apertures still containing the glass cylinders. The excess of the metal shells are then removed from the surface of the jig, thereby leaving rows of axially aligned shells and glass cylinders with two shells disposed between each pair of cylinders. A comb-like structure is provided having a series of parallel wire mandrels forming the teeth of the comb, the spacing of the wire mandrels corresponding to the spacing of the rows of the jig. The comb-like structure is then placed at one end of the jig and the mandrels inserted into the rows of axially aligned cylinders and shells, and the comb-like structure then moved toward the jig to string the rows of cylinders and shells onto the wire mandrels. The comb-like structure is then lifted upward from the jig to remove all of the cylinders and shells from the jig, each comb-like structure holding a plurality of rows of cylinders and shells maintained in the proper coaxial alignment for fabrication into subassemblies. The cylinders and shells are restrung onto individual wire mandrels and then subjected to the so-called black seal process, to create the preassembled structures followed by subsequent presentation of the structures to a fusion machine to complete the glass-to-metal seal and form the desired subassemblies.

The novel features which are believed to be characteristic of the invention, both as to its organization and method of operation, together with further objects and advantages thereof, will be better understood from the following description considered in connection with the accompanying drawing in which a presently preferred embodiment of the apparatus of the present invention is illustrated by way of example. It is to be expressly understood, however, that the drawings are for the purpose of illustration and example only and are not intended as a definition of the limits of the invention.

In the drawing:

FIGURE 1 is a pictorial view showing a jig and a receptacle for agitation of the jig;

FIGURE 2 is an elevational view showing the jig disposed within the receptacle, the jig being manually agitated while glass cylinders are being randomly scattered on the surface of the jig;

FIGURE 3 is a perspective view showing a number of randomly oriented glass cylinders;

FIGURE 4 is a perspective view partially cut away, showing the glass cylinders contained within the jig;

FIGURE 5 is a partial elevational view showing the jig within a receptacle during the random scattering of metal shells on the surface of the jig;

FIGURE 6 is a pictorial view showing a plurality of metal shells in random alignment;

FIGURE 7 is a plan view of the jig showing its laminated construction;

FIGURE 8 is an elevation view of the jig;

FIGURE 9 is an enlarged partial plan view of the jig, containing a plurality of glass cylinders and metal shells;

FIGURE 10 is a view taken along the line 10—10 of FIGURE 9;

FIGURE 11 is an exploded view showing how two metal shells and an intermediate glass cylinder are combined to form a preassembled encapsulating structure;

FIGURE 12 is a partial exploded view showing the structure of the various laminations of the jig;

FIGURE 13 is a pictorial view showing the jig loaded with the glass cylinders and metal shells and a comb-like structure containing wire mandrels for insertion into the jig;

FIGURE 14 is a partial plan view of the comb-like structure showing how the glass cylinders and metal shells are strung on the projecting wire mandrels;

FIGURE 15 shows a partial pictorial view showing the plurality of encapsulating structures after preassembly, contained within a holding fixture into which are inserted individual wire mandrels;

FIGURE 16 shows an individual wire mandrel for insertion into the holding fixture of FIGURE 15; and FIGURE 17 shows an elevational view, partially in section, of a resultant glass-to-metal subassembly.

Referring now to the drawing, and more particularly to FIGURE 11 thereof, there is shown an exploded view indicating the components of a preassembled encapsulating structure and the relative alignment of the components. The encapsulating structure indicated generally by the reference numeral 10, consists of a glass cylinder 11 intermediate two identical metal shells 12. A peripheral ridge or bump 13 extends transversely around the center of each of the shells 12. The outer diameter of the end portions of the shells 12 is slightly smaller than the inner diameter of the glass cylinder 11 so that the shells 12 may be inserted into the glass cylinder until the bumps 13 bear against the end surfaces of the cylinder.

In FIGURES 7 and 8 of the drawings there are shown plan and elevation views of a laminated jig comprising an assemblage of plates, the plates being shown in the exploded view of FIGURE 12. Referring specifically to FIGURE 12 an end plate 20 has a series of rectangular grooves 21 in its upper surface 22. The width of the rectangular grooves 21 is approximately equal to the inner diameter of the metal shells 12 and the depth of the grooves 21 is a predetermined distance less than the maximum diameter of the shells. Abutted against the end plate 20 is a thicker plate 25. The plate 25 has a series of grooves 26 in its upper surface 27, the bottoms of the grooves 26 being semicircular. The width and depth of the grooves 26 is substantially equal to but slightly larger than the maximum diameter of the shells 12 at the peripheral ridge 13. The thickness of the plates 25 is substantially equal to but slightly greater than the length of the metal shells 12 so that a metal shell 12 can be accommodated in each of the grooves 26, the shells 12 extending longitudinally across the thickness dimension of the plate 25. Abutted against the plate 25 is a thin divider plate 30. The plate 30 has a series of rectangular grooves 31 in its upper surface 32. The width and depth of the grooves 31 correspond to the width and depth of the grooves 21 in the upper surface 22 of the end plate. Contiguous with the divider plate 30, is a thick plate 35. The plate 35 has a series of grooves 36 in its upper surface 37, the bottom of the grooves 36 being of semicircular configuration. The width and depth of the grooves 36 are substantially equal to but slightly greater than the outer diameter of the glass cylinders 11. The thickness of the plate 35 is substantially equal to but slightly greater than the length of the glass cylinders 11 so that a glass cylinder can be accommodated in each of the grooves 36 with the glass cylinders 11 extending longitudinally across the thickness dimension of the plate.

Each of the plates 20, 25, 30 and 35, are provided with three identical apertures, the apertures in each plate being respectively identified by the reference numerals 23, 28, 33, and 38. The apertures are identically positioned in each of the plates with an aperture near each end of the plate and an aperture at the center of the plate, the apertures extending through the thickness dimension of the plate. In the abbreviated view of FIGURE 12 only one of the end apertures is shown in each plate.

A plurality of the plates 20, 25, 30 and 35, in a predetermined order, are held together in an assemblage by three elongated rods 40 inserted through the apertures in the plates, as can best be seen in FIGURES 7 and 8. The various plates are secured in an assemblage on the rods 40 by capscrews 41 and washers 42 threaded into the opposite ends of the rods 40. The jig comprised of the assemblage of plates and the securing rods and screws is generally indicated by the reference numeral 45.

The plates 20, 25, 30 and 35 are of identical length and height but of differing thicknesses are previously indicated. The grooves 21, 26, 31 and 36, are centrally aligned when the plates are assembled to form the jig 45. The jig 45 is formed by assembling, in side-by-side relationship, a plurality of plates in a predetermined order, the beginning of the order being shown in FIGURE 12 and proceeding as follows: an end plate 20, a plate 25, a divider plate 30, a plate 35, a divider plate 30, a plate 25, a divider plate 30, a plate 25, a divider plate 30, a plate 35, a divider plate 30, a plate 25, a divider plate 30, a plate 25 . . . a divider plate 30, a plate 35, a divider plate 30, a plate 25, and an end plate 20. This particular order of plates will provide rows of metal shells and glass cylinders aligned in end-to-end relationship in the various grooves of the plate and in the desired order for subsequent fabrication into subassemblies. Thus, when the grooves 26 in the plates 25 are filled with metal shells 12 and the grooves 36 in the plates 35 filled with glass cylinders 11, a predetermined order of shells and cylinders will be created in coaxial end-to-end relationship, the order being as follows: shell, cylinder, shell, shell, cylinder shell, shell, . . . cylinder, and shell. This particular arrangement of shells and cylinders will be utilized in the performance of the present invention method as will now be described.

Turning now to FIGURES 1 and 2 of the drawing, there is shown a receptacle, generally indicated by the reference numeral 50. The receptacle 50 is comprised of a tray 51 angularly supported at its lower surface 52 by support flanges 53 and 54. The lowermost end of the tray 50 defines an elongate opening 56, for easy emptying of the tray 51 into a small box 57. Rotatably mounted to the lower surface 52 of the tray 51 are a first pair of rollers 61 and a second pair of rollers 62. The rollers 61 are affixed to a shaft 63 which is horizontally disposed at a spaced distance below the lower surface 52 by supporting journals 64 so that only a relatively small segment of the rollers 61 project into the tray 51. The rollers 62 are mounted on a shaft 66, the shaft 66 being held in horizontal alignment by supporting journals 67 proximately against the under side of the bottom 52 of the tray 51 so that almost a semicircular segment of the rollers 62 project into the tray 51. The journals 64 and 67 serve to position the rollers 61 and 62 so that the upper surfaces of the rollers are in a substantially horizontal plane.

In the practice of the present invention method a jig 45 is placed upon the uppermost surfaces of the rollers 61 and 62. The operator agitates the jig 45 by manually moving the jig back and forth across the rollers 61 and 62 while simultaneously scattering a large number of glass cylinders 11 over the grooved upper surface of the jig 45. The glass cylinders 11 can be conveniently scattered by means of a scoop 60 so that the upper surface of the jig will be covered with the glass cylinders 11 in a random configuration indicated generally in FIGURE 3. By continued agitation of the jig 45, certain of the glass cylinders 11 will fall into the grooves 36 in the plates 35 contained within the laminated jig, these grooves being the only ones large enough to accommodate the glass cylinders. Repeated scattering of the glass cylinders and agitation of the jig is continued until all of the grooves 36 in each of the plates 35 are occupied. Note that since the length of the glass cylinders 11 exceeds their outer diameter the cylinders will all be in aligned relationship extending longitudinally across the thickness dimension of the plates 35. At this point the upper surface of the jig is brushed to remove the excess of the glass cylinders 11, the excess of the cylinders falling onto the bottom of the tray and progressing through the opening 56 into the box 57.

A glass cover plate 70 is then placed upon the upper surface of the jig 45, as shown in FIGURE 4, and the jig containing the glass cylinders is then safely removable to another processing station without danger of dislodging any of the glass cylinders. The jig 45 is then transported to a second processing station at which there is positioned another receptacle identical to the receptacle 50. Alternatively, the receptacle 50 at the first processing station may be utilized upon removal of all of the excess glass cylinders therefrom and by substituting another box similar to the box 57, beneath the opening 56. If this alternative procedure is followed, then placement of the cover plate 70 over the jig will be unnecessary since the jig is not to be transported at this point. In accordance with the next step of the present invention method the jig 45, containing the glass cylinders 11, is placed upon the uppermost surfaces of the rollers 61 and 62 within the receptacle 50 and agitated by a back and forth movement as before. While agitating the jig 45 a large number of metal shells 12 are scattered over the surface of the jig by means of the scoop 60 until the upper surface of the jig is covered with a random configuration of the shells as indicated in FIGURE 6. The agitation of the jig and scattering of the metal shells is continued until each of the grooves 26 in the plates 25 of the jig are occupied by a metal shell 12. Note that although the grooves 36 in the plates 35 are larger than the grooves 26 in the plates 25, the metal shells cannot fall into any of the grooves 36 because all of the grooves 36 are occupied by glass cylinders 11. Also, since the length of the metal shells 12 is greater than the maximum diameter of the shells, the shells will be longitudinally aligned in the grooves 26 and extend across the thickness dimension of the plates 25. The excess of the shells 12 remaining on the upper surface of the jig are then brushed off and fall to the bottom surface 52 from whence they are swept through the opening 56 into a box 57.

At this point all of the grooves 36 in the plates 35 are filled with glass cylinders and all of the grooves 26 in the plates 25 are filled with metal shells, the shells and cylinders being disposed in predetermined end-to-end relationship and being generally coaxial, as indicated in FIGURES 9 and 10. Application of the glass cover plate 70 to the upper surface of the jig 45 enables the loaded jig to be freely moved about.

The jig 45, containing the desired orientation of glass cylinders and metal shells, is placed upon a table and the glass cover plate 70 held on the upper surface of the jig 45 by a spring loaded roller 71, as indicated in FIGURE 13. A comb-like structure generally indicated by the reference numeral 75, consists of a plurality of identical wire mandrels 76 mounted to a metal supporting bar 77, by means of set screws 78 (see FIGURE 14). The spacing of the wire mandrels 76, forming the projecting teeth of the comb-like structure 75, corresponds with the center-to-center spacing of the grooves in the upper surface of the laminated jig 45. Due to the grooves 21 in the end plates 20 and the grooves 31 in the divider plates 30 of the jig, the wire mandrels 76 can be inserted completely through the jig 45 with the wire mandrels 76 extending through the central openings of the metal shells and the glass cylinders contained therein. The depth of the grooves 21 and 31 in the end plates 20 and the divider plates 30 are sufficient to expose the inner openings through the metal shells and the glass cylinders yet small enough to prevent passage of the metal shells therethrough. Also shown in FIGURE 13 is a keeper plate 68 having a plurality of grooves 69 in one edge thereof. The grooves 69 are of a width slightly greater than the diameter of the wire mandrels 76, the spacing of the grooves 69 corresponding to the spacing of the mandrels 76. The keeper plate 68 is used in conjunction with the comb-like structure 75 in a manner to be hereinafter explained.

As shown in FIGURE 13, with the glass cover plate 70 being held against the upper surface of the jig 45 by means of the roller 71, the wire mandrels 76 are inserted through the grooves in the jig and through the central openings of the aligned shells and cylinders until the metal support 77 is abutted against the nearest end plate 20 of the jig. With the comb-like structure 75 thusly inserted in the jig 45, the glass cylinders and metal shells are strung upon the wire mandrels 76. The pressure roller 71 is then withdrawn and the glass cover plate 70 removed from the upper surface of the jig 45. The metal support 77 of the comb-like structure 75 is grasped and the structure rotated to elevate the wire mandrels 76 as the comb-like structure 75 and the shells and cylinders contained thereon are removed from the jig 45. Holding the comb-like structure 75 with the wire mandrels 76 in a vertical position, the comb-like structure is gently agitated to cause the metal shells and glass cylinders strung on the wire to move downward to partially telescope the shells within the glass cylinders. By holding the comb-like structure up to a source of light the assembled cylinders and shells may be visually inspected for proper fit. The visual inspection is very rapid since the diameter of the wire mandrels 76 is only slightly smaller than the inner diameters of the glass cylinders 11 and metal shells 12 so that only a slight shaking of the comb-like structure 75 is necessary to cause the telescoping of the metal shells 12 into the glass cylinders 11 until the peripheral ridge 13 of the shells abut against the ends of the glass cylinders with the ends of adjacent shells abutting against each other.

Upon visual inspection of these partially telescoped components mounted on the wire mandrels, and replacement of any defective components, the string of components is moved slightly away from the metal support 77 of the comb-like structure by means of the keeper plate 68. The keeper plate 68 is positioned adjacent to the metal holder 77 with the grooves 69 in alignment with the wire mandrels 76. The keeper plate 68 is then moved toward the comb-like structure 75 with a wiggling type of motion to move the string of components slightly away from the metal support 77 as the wire mandrels slowly become fitted within the grooves 69 of the keeper plate 68 (see FIGURE 14). While holding the keeper plate 68 in assembly with the comb-like structure 75, the keeper plate 68 straddling the wire mandrels 76 and bucking against the metal holder 77, the components strung on the mandrels are placed upon a holding fixture in the form of a grooved plate 80. As shown in FIGURE 15 of the drawing the plate 80 is a generally rectangular configuration and has a series of parallel, longitudinal, lineal grooves 81 on its upper surface 82. The spacing of the parallel grooves 81 corresponds to the mandrel spacing of the comb-like structure 75 and the grooves are of sufficient size to accommodate the row of components strung on each mandrel. Unlike the grooves in the upper surface of the jig 45, the grooves 81 are of uniform size throughout their length. Mounted at either end of the plate 80, transverse to the lineal grooves 81 therein, are end plates 83. The end plates 83 have a series of rectangular grooves 84, the size and spacing of the grooves 84 corresponding to the size and spacing of the grooves 21 in the end plates 20 of the jig 45. The rectangular grooves 84 in the end plates 83 are in alignment with the longitudinal grooves 81 in the upper surface 82 of the plate 80. The loaded comb-like structure 75 is lowered into position above the upper surface 82 of the plate 80 to dispose the components strung on the wire mandrels 76 within the grooves 81, the keeper plate 68 being maintained in the proximate alignment with the nearer of the end plates 83. Further lowering of the metal support 77, combined with an upward withdrawal of the keeper plate 68 will cause the exposed end portions of the wire mandrels 76 adjacent to the metal support 77 to become disposed within the grooves 84 in the end plate 83. Then, with the string of components resting with the grooves 81, a glass cover plate 85 is positioned on the upper surface 82 of the plate 80. The cover plate 85 is held in position against the upper surface 82 of the grooved plate 80 by a spring loaded roller 86 so that the wire mandrels 76 may be withdrawn from the grooves 81. Upon withdrawal of the wire mandrels 76 from the grooves 81 by movement of the comb-like structure 75 away from the plate 80, the components will remain within the grooves 81 since the small rectangular grooves 84 and the end plate 83 are too small to allow their passage.

Next, individual wire mandrels 90 are inserted in each of the grooves 81 to string the row of components within each groove onto a wire mandrel. After a wire mandrel is inserted into each one of the grooves 81, the pressure roller 86 is released and the cover plate 85 removed to allow removal of the individual mandrels. As each of the mandrels 90 is removed a wire retaining clip 91 is fastened to the pointed end of the mandrel to retain the string of metal tubes and glass cylinders on the mandrel, as indicated in FIGURE 16.

The wire mandrels 90 should be of a material which is a good thermal conductor and which maintains its strength at the elevated temperatures encountered during the presealing process while remaining chemically inert. Nickel-chromium alloy wire has been found to be particularly satisfactory for this purpose. One such alloy is sold under the trademark "Nichrome" by the Driver-Harris Company of Harrison, New Jersey. Nichrome alloy consists essentially of 80% nickel and 20% chromium. Another alloy which has been found to be suitable for the purposes stated is the alloy known as "Inconel X," manufactured by the International Nickel Company, Inc., of New York. Inconel X alloy consists of the following: 9% iron, 15% chromium, and approximately 70% nickel, with traces of other constituents such as carbon, manganese, copper and aluminum, among others.

The loaded wire mandrels 90 of FIGURE 16 are then subjected to the so-called black seal process described in the above referenced C. E. Maiden application, during which the glass cylinders 11 are shrunk onto the metal shells 12 to produce a fairly strong bond which unites each glass cylinder intermediate two metal shells partially telscoped therein to form a preassembled encapsulating structure 10. FIGURE 17 of the drawing shows an elevational view, partially in section, of a structure 10 formed by the black seal process. Therefore, at this point, each of the wire mandrels 90 has strung thereon a plurality of preassembled structures 10. Removal of the retaining clip 91 from the pointed end of the mandrels 90 enables the removal of the structures 10 from the mandrels and their subsequent presentation to a fusion machine or to other processing equipment not a part of the present invention.

Thus, there has been described a mass production technique for easily and rapidly assembling a plurality of glass cylinders and metal shells into preassembled encapsulating structures. Each of the structures thus produced is of substantially identical size and fit and held in an assemblage by a mechanical bond sufficient to enable subsequent handling of the structures and to eliminate the necessity of individually assembling the shells and cylinders in a fusion machine. Prior to the present invention the configuration of FIGURE 16 was obtained by individually stringing the metal shells and glass cylinders by hand onto the mandrel. In accordance with the present invention, utilization of a novel jig and comb-like structure enables stringing of a number of the mandrels very rapidly thereby saving a significant amount of time and effort and hence resulting in a reduction of costs.

Although the invention has been described with a certain degree of particularity, it is understood that the present disclosure has been made only by way of example and that changes in the method and in the combination and arrangement of parts used in conjunction with the method may be resorted to without departing from the spirit and the scope of the invention as hereinafter claimed.

What is claimed is:

1. The method of coaxially aligning first and second tubular members wherein said first tubular members have a greater outer diameter than the outer diameter of said second tubular members and wherein said second tubular members include means to limit the telescoping position of said first members relative to said second members, said method comprising: providing in a substantially planar surface spaced apart first cavities adapted to receive said first tubular members in coaxial alignment; providing in said substantially planar surface spaced apart second cavities adapted to receive said second tubular members in coaxial alignment with said first tubular members, one each of said first cavities being positioned between two of said second cavities; randomly disposing a plurality of said first tubular members on said planar surface; agitating said planar surface to selectively position said first tubular members in said first cavities; randomly disposing a plurality of said second tubular members on said planar surface; and, agitating said planar surface to selectively position said second tubular members in said second cavities.

2. The method of coaxially aligning first and second tubular members wherein said first tubular members have a greater outer diameter than the outer diameter of said second tubular members and wherein said second tubular members include means to limit the telescoping position of said first members relative to said second members, said method comprising: providing in a substantially planar surface spaced apart first cavities adapted to receive said first tubular members in coaxial alignment; providing in said substantially planar surface spaced apart second cavities adapted to receive said second tubular members in coaxial alignment with said first tubular members, two of said second cavities being positioned between each two of said first cavities; randomly disposing a plurality of said filter tubular members on said substantially planar surface; agitating said substantially planar surface to selectively position said first tubular members in said first cavities; randomly disposing said second tubular members on said substantially planar surface; and, agitating said substantially planar surface to selectively position said second tubular members in said second cavities.

3. The method of coaxially aligning first and second tubular members wherein said first tubular members have a greater outer diameter than the outer diameter of said second tubular members and wherein said second tubular members include means to limit the telescoping position of said first members relative to said second members, said method comprising: providing in a substantially planar surface spaced apart first cavities adapted to receive said first tubular members in coaxial alignment; providing in said substantially planar surface spaced apart second cavities adapted to receive said second tubular members in coaxial alignment with said first tubular members, two of said second cavities being positioned between each two of said first cavities; randomly disposing a large number of said first tubular members on said substantially planar surface; agitating said substantially planar surface to selectively position one each of said first tubular members in each of said first cavities; removing the excess of said first tubular members from said substantially planar surface without disturbing the tubular members disposed within said first cavities; randomly disposing a large number of said second tubular members on said substantially planar surface; agitating said substantially planar surface to selectively position one each of said second tubular members in each of said second cavities; and, removing the excess of said second tubular members from said substantially planar surface without disturbing the tubular members disposed within said cavities.

4. The method of assembling coaxially aligned first and second tubular members into telescoping arrangement wherein said first tubular members have a greater outer diameter than that of said second tubular members and wherein said second tubular members include means to limit the telescoping position of said first members relative to said second members, said method comprising: providing in a substantially planar surface spaced apart first cavities adapted to receive said first tubular members in coaxial alignment; providing in said substantially planar surface spaced apart second cavities adapted to receive said second tubular members in coaxial alignment with said first tubular members, one each of said first cavities being positioned between two of said second cavities and in communication therewith; randomly disposing a plurality of said first tubular members on said planar surface; agitating said planar surface to selectively position said first tubular members in said first cavities; randomly disposing a plurality of said second tubular members on said planar surface; agitating said planar surface to selectively position said second tubular members in said second cavities; inserting an elongate member coaxially through said first and second tubular members disposed within said cavities; and, removing said elongate members containing said first and second tubular members thereon from said planar surface and agitating said elongate member to place said first and second tubular members in coaxial telescoping alignment.

5. The method of assembly coaxially aligned first and second tubular members into telescoping arrangement wherein said first tubular members have a greater outer diameter than the outer diameter of said second tubular members and wherein said second tubular members include means to limit the telescoping position of said first members relative to said second members, said method comprising: providing in a substantially planar surface spaced apart first cavities adapted to receive said first tubular members in coaxial alignment; providing in said substantially planar surface spaced apart second cavities adapted to receive said second tubular members in coaxial alignment with said first tubular members, two of said second cavities being positioned between each two of said first cavities and in communication therewith; randomly disposing said first tubular members on said substantially planar surface; agitating said substantially planar surface to selectively position said first tubular members in said first cavities; randomly disposing said second tubular members on said substantially planar surface; agitating said substantially planar surface to selectively position said second tubular members in said second cavities; inserting an elongate member coaxially through said first and second tubular members disposed within said cavities; and, removing said elongate member containing said first and second tubular members thereon from said substantially planar surface and agitating said elongate member to place said first and second tubular members in coaxial telescoping alignment.

6. The method of assembling coaxially aligned first and second tubular members into telescoping arrangement wherein said first tubular members have a greater outer diameter than the outer diameter of said second tubular members and wherein said second tubular members include means to limit the telescoping position of said first members relative to said second members, said method comprising: providing in a substantially planar surface spaced apart first cavities adapted to receive said first tubular members in coaxial alignment; providing in said substantially planar surface spaced apart second cavities adapted to receive said second tubular members in coaxial alignment with said first tubular members, two of said second cavities being spaced between each two of said first cavities and in communication therewith; randomly disposing a large number of said first tubular members on said substantially planar surface; agitating said substantially planar surface to selectively position one each of said first tubular members in each of said first cavities; removing the excess of said first tubular members from said substantially planar surface without disturbing the tubular members disposed within said first cavities; randomly disposing a large number of said second tubular members on said substantially planar surface; agitating said substantially planar surface to selectively position one each of said second tubular members in each of said second cavities; removing the excess of said second tubular members from said substantially planar surface without disturbing the tubular members disposed within said cavities; inserting an elongate member coaxially through said first and second tubular members disposed within said cavities; and, removing said elongate members containing said first and second tubular members thereon from said substantially planar surface and agitating said elongate member to place said first and second members in coaxial telescoping alignment.

References Cited by the Examiner

UNITED STATES PATENTS

| | | |
|---|---|---|
| 1,215,735 | 2/1917 | Stacey. |
| 1,289,607 | 12/1918 | Batchelder 29—433 |
| 2,282,750 | 5/1942 | Schueler 29—433 |
| 2,768,431 | 10/1956 | Hughes 29—428 |
| 2,840,895 | 7/1958 | Minock 29—433 |
| 2,901,819 | 9/1959 | Schaffan 29—241 |
| 2,985,411 | 5/1961 | Madden. |
| 3,001,270 | 9/1961 | Friedman 29—241 |
| 3,061,919 | 11/1962 | Tack 29—428 |

CHARLIE T. MOON, *Primary Examiner.*

WHITMORE A. WILTZ, *Examiner.*